Figure 1:
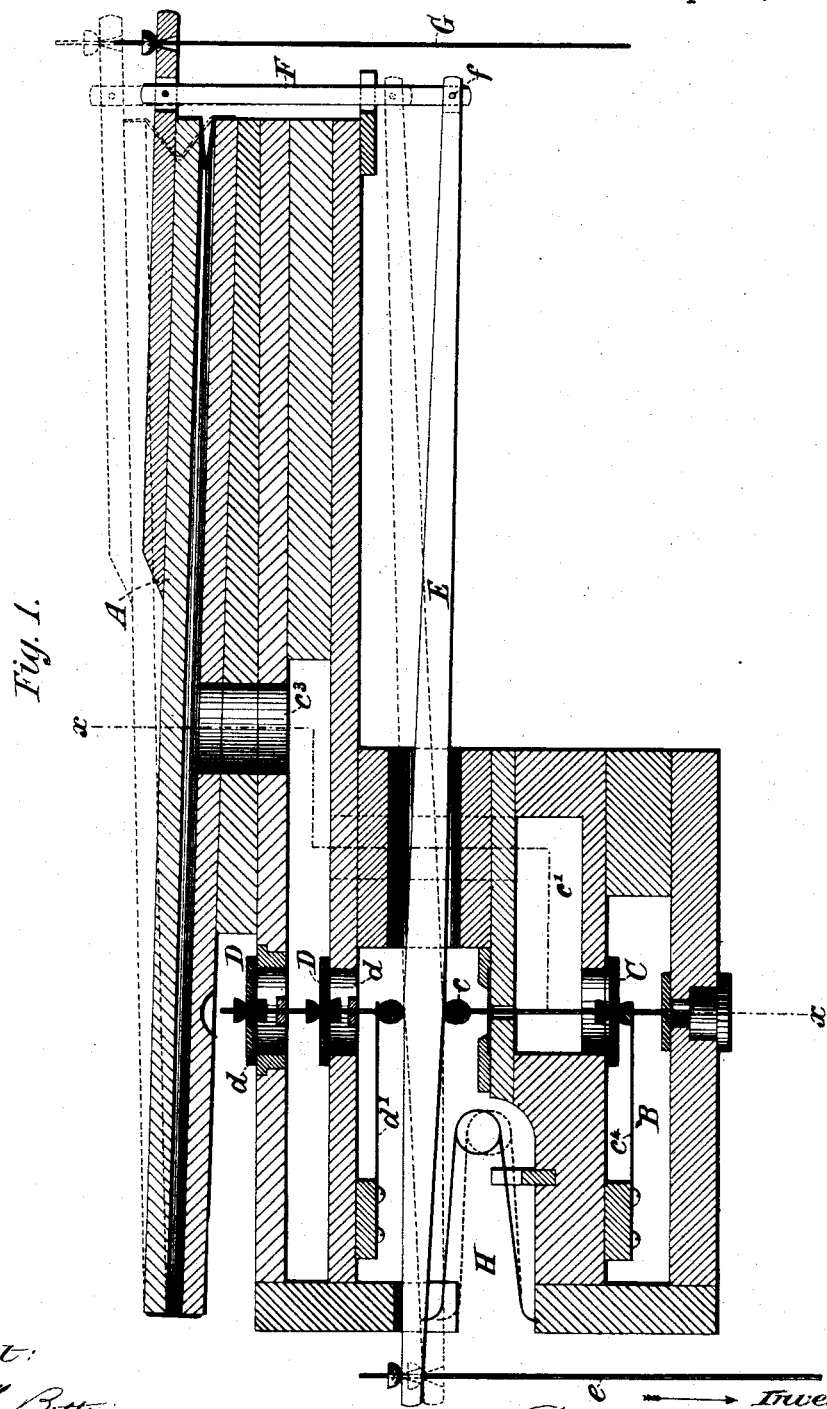

(No Model.) 7 Sheets—Sheet 1.

V. WILLIS.
PNEUMATIC ACTION FOR ORGANS.

No. 339,608. Patented Apr. 6, 1886.

(No Model.) 7 Sheets—Sheet 2.

V. WILLIS.
PNEUMATIC ACTION FOR ORGANS.

No. 339,608. Patented Apr. 6, 1886.

(No Model.)  7 Sheets—Sheet 3.
V. WILLIS.
PNEUMATIC ACTION FOR ORGANS.
No. 339,608.  Patented Apr. 6, 1886.
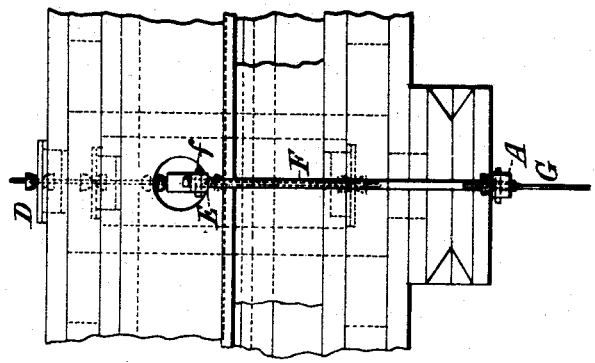
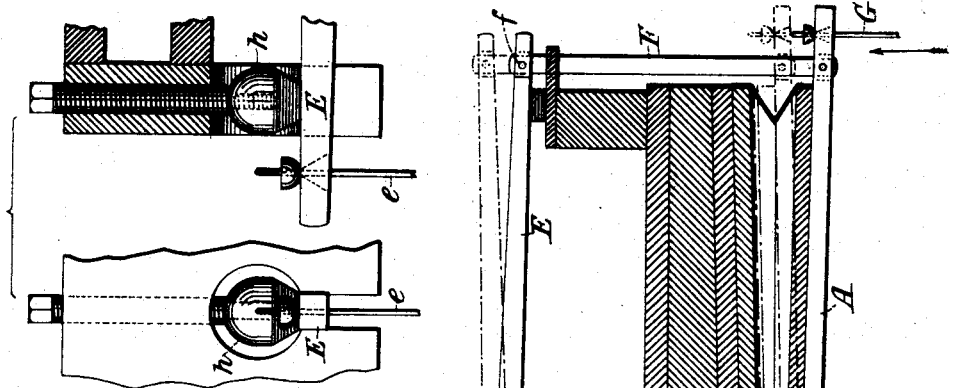
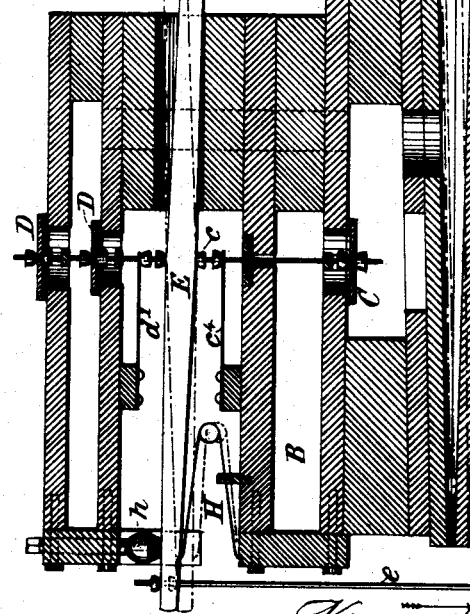
Attest:
Geo. H. Botts
H. A. Jasbera
Inventor:
Vincent Willis

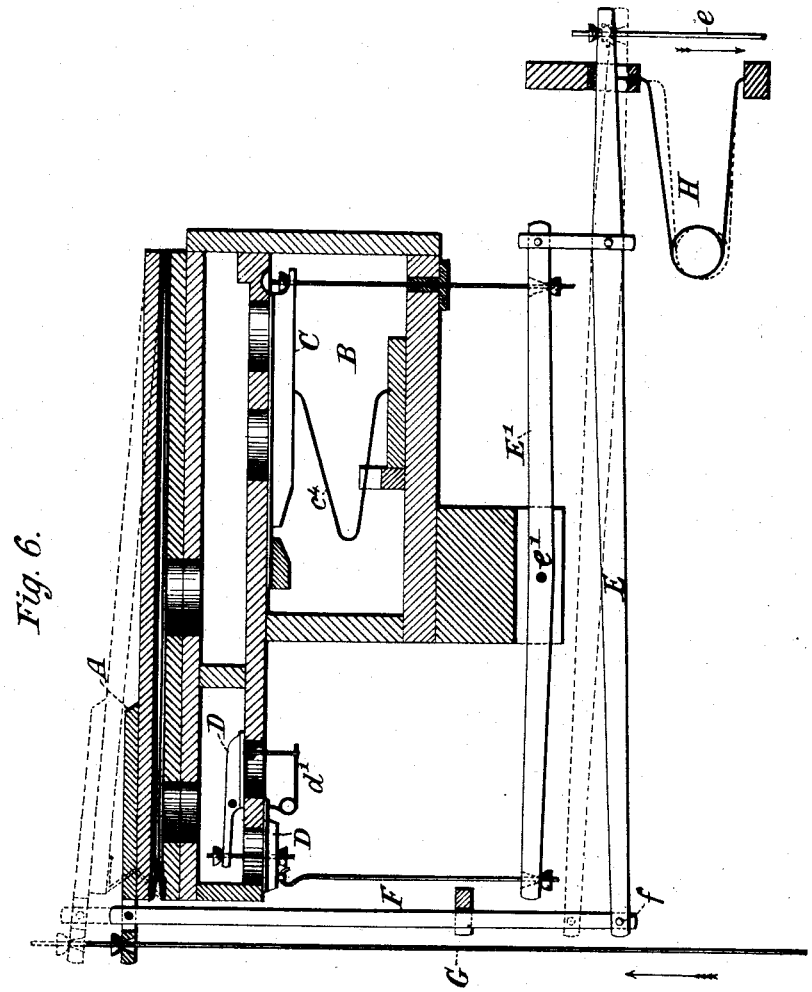

(No Model.)

V. WILLIS.
PNEUMATIC ACTION FOR ORGANS.

No. 339,608. Patented Apr. 6, 1886.

Attest:
Geo. H. Botts,
A. N. Jasbern

Inventor:
Vincent Willis

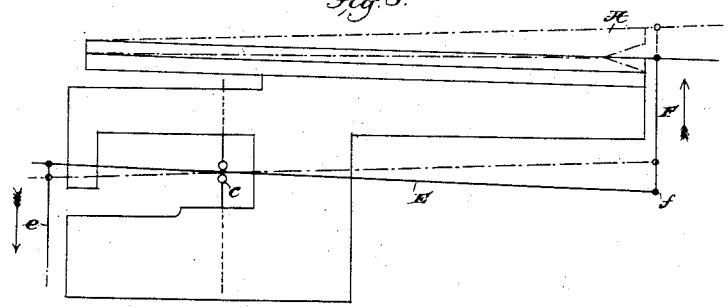
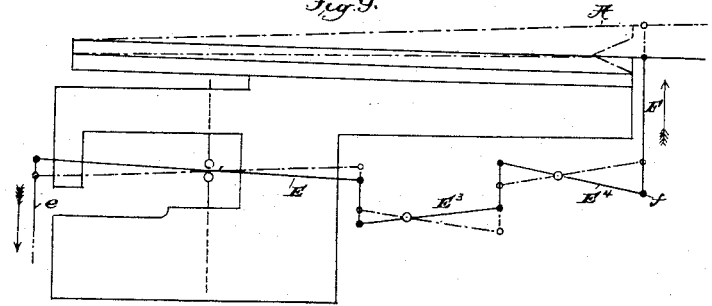
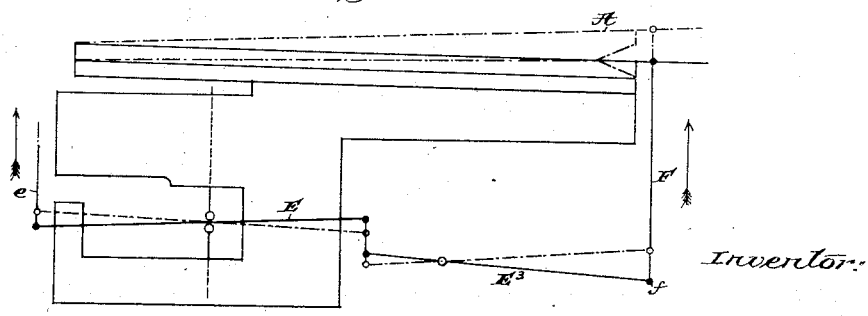

(No Model.) 7 Sheets—Sheet 7.
V. WILLIS.
PNEUMATIC ACTION FOR ORGANS.
No. 339,608. Patented Apr. 6, 1886.
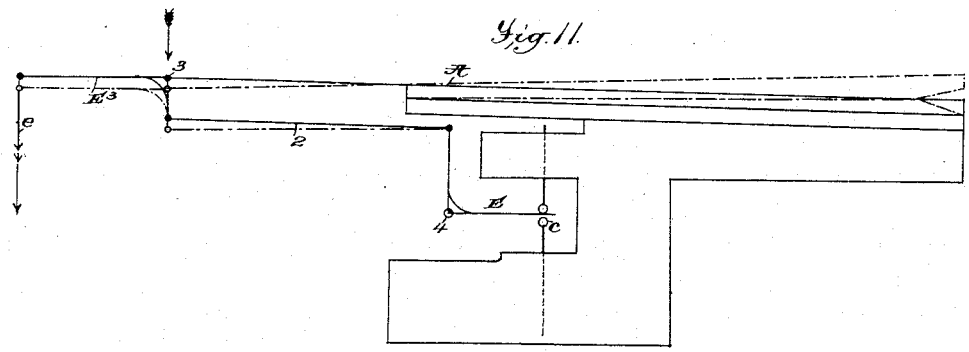
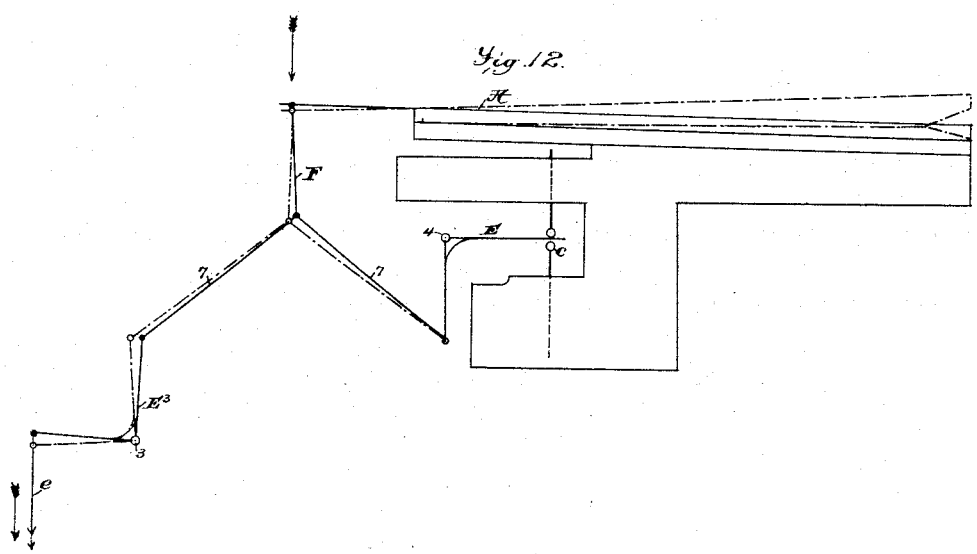
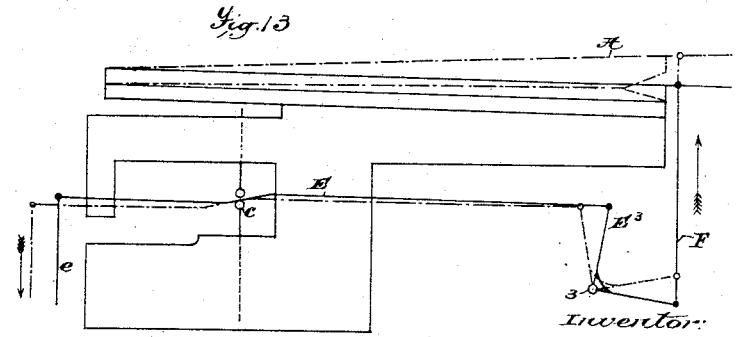
Attest:
Geo. H. Botts
Geo. H. Graham
Inventor:
Vincent Willis
by
Munson & Philipp
Attys

UNITED STATES PATENT OFFICE.

VINCENT WILLIS, OF CAMDEN-TOWN, COUNTY OF MIDDLESEX, ENGLAND.

PNEUMATIC ACTION FOR ORGANS.

SPECIFICATION forming part of Letters Patent No. 339,608, dated April 6, 1886.

Application filed January 2, 1885. Serial No. 151,737. (No model.) Patented in England November 17, 1884, No. 15,114.

*To all whom it may concern:*

Be it known that I, VINCENT WILLIS, of 9 Rochester Terrace, Camden-Town, in the county of Middlesex, England, organ-builder, have invented certain new and useful improvements in the action of key-board instruments, especially applicable to organs, (for which I have received Letters Patent in England, No. 15,114, dated November 17, 1884, and sealed June 5, 1885,) of which the following is a specification.

The present invention relates to improvements in the "action" of key-board instruments—such as organs—in which pneumatic levers are employed for various purposes.

The construction and use of what is known as the "pneumatic lever," or, as it is sometimes called, the "Barker Lever," are well known to organ-builders. In pneumatic levers as at present constructed and commonly used the supply and exhaust valves for admitting the air to and discharging it from the pneumatic lever are never entirely closed at the same time, and are often both partly open at the same time when in use. The result of this is a certain slowness of the lever in responding to the touch of the player and a considerable waste of air, which rushes uselessly through the pneumatic lever prior to the complete closure of one or other of the valves.

Now, the object of the present invention is to obtain a more instantaneous attack, with consequently improved repetition and less noise of the working parts; and to this end the invention consists in the combination, with the supply and exhaust valves in a pneumatic lever of any kind or series of such levers, of a lever or system of levers or their mechanical equivalent for operating the said valves, which valve-actuating lever or its equivalent is connected to or influenced by the pneumatic lever itself in such a manner that as the said pneumatic lever rises or falls or alters its position with the variation in the air-pressure upon or within it the fulcrum or operative position of the said valve-actuating lever is shifted or changed in anticipation of its counter or reverse movement, and that valve, whether supply or exhaust, which has just been opened by the action of the performer (transmitted through any convenient or well-known system of cranks and levers) will, through the connection established between the valve-actuating lever and the pneumatic lever, be allowed instantaneously to close or reseat itself, thus enabling the use of separate throttle-valves in pneumatic levers to be dispensed with, and preventing the escape of much air that would under previously-existing systems have been wasted.

The invention in its simplest form consists of a single lever or bar passing between push-buttons on the stems of the supply and exhaust valves, one end of this valve-lever being connected with the system, of whatever kind it may be, by which the movement of the key or stop to which it relates is transmitted, and the other end of the valve-lever being connected by a link-rod or its equivalent with the pneumatic lever itself or a prolongation thereof. This valve-lever may be appropriately designated a "floating lever," since the position of its fulcrum is constantly being shifted when in use by the opening and closing or change of position of the pneumatic lever, which lever in opening shifts the floating lever in such a manner as to allow one valve—say the air-inlet valve—to close or reseat itself, and puts the said floating lever into such a position that it can operate immediately upon the other (or air-outlet) valve when pressure on the key is removed, and vice versa.

By substituting a double-acting or compound lever one member of which has a shifting fulcrum for the single valve-actuating lever above described the invention can be applied with all its advantages to pneumatic levers of ordinary construction, the essential feature of the invention consisting in shifting or changing the position of the valve-actuating lever or equivalent valve-actuating devices synchronously with the movement of the pneumatic lever itself or, with an extension thereof, in anticipation or readiness for the next movement of the parts necessary for reversing the action of the pneumatic lever, and in so actuating the valves of a pneumatic lever that immediately either of the valves has acted to inflate or exhaust the pneumatic lever it shall reseat itself, both valves then remaining completely or practically closed until the key and its system of connections is released from pressure or receives a fresh movement under the hands of the performer.

The invention is especially applicable to organs, but may also be adapted to other keyboard instruments—such as pianos—in which a greater power than can be conveniently obtained from the hands of the performer alone combined with rapidity of attack may be desired.

It will be understood that the invention is applicable to all key-board instruments in which pneumatic levers of any kind are employed, for whatever purpose, and whether actuated by air-pressure or exhaust.

Figure 2:
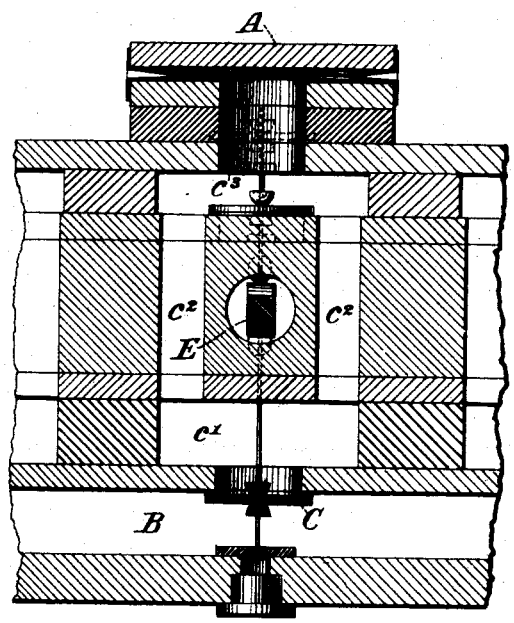
Figure 7:
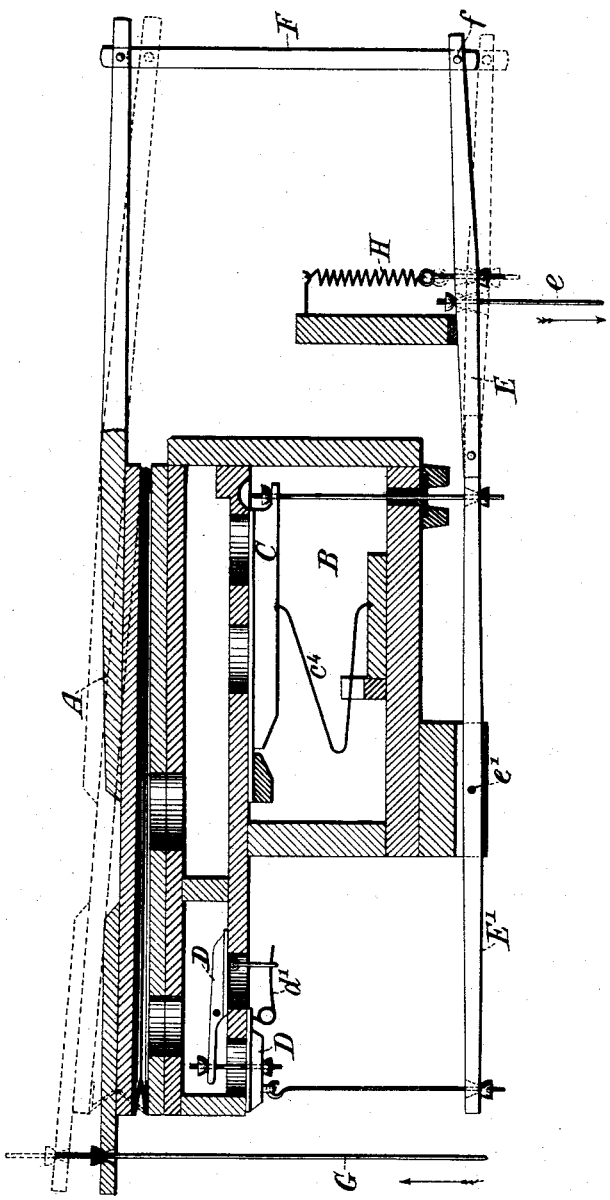

The invention is illustrated in the accompanying drawings, in which Figure 1 is a longitudinal sectional elevation of a pneumatic lever having its supply and exhaust valves directly operated by a floating lever under the control of the pneumatic lever itself according to my invention. Fig. 2 is a transverse section following the dotted line $x\ x$ of Fig. 1. Fig. 3 is a longitudinal sectional elevation showing the rearrangement of the parts necessary to be observed in applying my invention to a pneumatic lever which is operated by exhaust instead of by air-pressure. Fig. 4 is a rear end elevation of the same. Figs. 5 show on a larger scale, in front and longitudinal sectional views, details of the means employed for adjusting the range of motion of the floating valve-actuating lever. Fig. 6 is a longitudinal sectional elevation of a well-known form of pneumatic lever, showing a floating lever for actuating the valves according to my invention adapted thereto. Fig. 7 is a similar view showing another mode of applying my invention to pneumatic levers of existing type, and Figs. 8 to 13 are diagrams of various lever systems to be hereinafter referred to.

In all these figures the same letters of reference are used to indicate like or corresponding parts.

Referring now to Figs. 1 and 2, which illustrate the invention in its simplest form as applied to a pneumatic lever operated by air-pressure, A is the pneumatic lever; B, the wind-chest; C, the supply-valve, and D D a double-acting exhaust-valve.

E is the floating lever, by which these valves are alternately and respectively operated, connected at one end by a wire, $e$, or its equivalent and a system of levers or mechanical devices of any suitable and known construction (not shown in the drawings) with the key operated by the performer, and at the other by a link-rod, F, or its equivalent, with the pneumatic lever itself.

G is the wire or its equivalent by which the power exerted by the pneumatic lever is transmitted to the register, valve, swell-pedal, or other movable part or parts of the organ, as usual.

The drawn lines represent the several parts in their quiescent or normal position, the fulcrum $f$, or point at which the floating lever E is connected to the link-rod F, carried by the pneumatic-lever A, being then in its lowermost position. On pressure being applied to the key connected to this floating lever the wire $e$ will move in the direction of the arrow, drawing down the forward end of the lever E, which lever E, being temporarily fulcrumed at $f$, will, in its downward movement, press against the end $c$ of the air-supply valve C, and force that valve off its seat. So soon as this occurs the wind rushing through the conduits $c'\ c^2\ c^3$, Figs. 1 and 2, will inflate the pneumatic lever A, but in so doing the fulcrum $f$ of the floating lever E will be raised, and the parts will assume the positions represented by the dotted lines in Fig. 1. Pressure on the stem of the valve C having been removed the very instant it was forced off its seat by the resulting inflation and rising of the pneumatic lever A, the said valve C instantly reseats itself and acts as a throttle-valve, cutting off the further supply of air to the pneumatic lever. The reverse movement is as follows: The several parts being in the dotted position, and the fulcrum $f$ of the floating lever E in its highest position, it will be seen that when pressure on the key is relaxed by the performer the front end of the floating lever E will rise under the influence of the spring H and lift the double exhaust-valve D off its seat; but so soon as this is done the pneumatic lever A will collapse, owing to the air within it escaping past the valve at $d\ d$, and by thrusting down or lowering the fulcrum-point $f$ of the lever E will remove all pressure from the stem of the valve D, which valve will reseat itself, and the parts will assume their original position, or that shown in full lines.

It should be clearly understood that although the action of the several parts is here described as occurring in successive stages, the interval which elapses between the opening of, say, the valve C and the closing of that valve consequent upon the movement of the pneumatic lever and the consequent relief of pressure on the said valve which is thereby afforded is inappreciable; and, further, that the movement of these valves C D is so light and rapid as in practice to be scarcely detected.

As will be seen from the drawings, well-known means are provided for nicely adjusting the disks or valve-faces to their work, and springs—such as $c^4\ d'$—are employed for assisting them to reseat themselves after either of them has been opened. The valve D is very nearly balanced, the lower outlet-orifice being, however, of slightly larger area than the upper outlet-orifice, and thus the air-pressure, when inflating the pneumatic lever A, tends to keep the exhaust-valve shut.

The valve-stems play through suitable guide-pieces, as will be well understood from the drawings.

From the foregoing it will be seen that the fulcrum $f$ of the floating lever E is, by reason of its connection with the pneumatic lever A, shifted synchronously with the opening or closing movement of that lever and placed in such a position that while instantly relieving of pressure that valve which has just caused such opening or closing movement it is in the most advantageous position to effect the instantaneous reversal of the pneumatic lever by acting on the other valve.

In Figs. 3 and 4 a similar arrangement of parts is shown to illustrate the invention as adapted to a pneumatic lever actuated by exhaust.

The action of the parts may be briefly described as follows: Both valves being closed, and the pneumatic lever A being in its normal or (under the exhaust system) open position, the fulcrum $f$ of the floating lever E will be on its lowest or drawn position, and on a pull being transmitted in any suitable or known manner to the wire $e$ by the player the forward end of that lever will be depressed, thrusting the valve C off its seat, and opening the interior of the pneumatic lever A to the exhaust-chamber B. This will cause the desired movement or collapse of the lever A, the simultaneous shifting of the fulcrum $f$, the relief from pressure of the stem of the valve C, and the consequent closing of that valve under the influence of the exhaust and the spring $c^4$. The parts will then be in the dotted position of Fig. 3. On relieving the pull upon the forward end of the lever E it will be lifted under the influence of the spring H, and (its fulcrum $f$ being then at the highest position) will thrust the double-seated valve D off its seat, thus admitting air to the pneumatic lever A by suitable inlet-channels and causing its reverse movement or inflation. The result of this is to restore the parts to their normal position, whereby the fulcrum $f$ is shifted to its lower position, and pressure on the stem of the valve D is removed, thus allowing that valve D to reseat itself under the influence of the air-pressure aided by the spring $d'$. In both the arrangements, Figs. 1 and 2 and 3 and 4, the valves C and D open alternately, and are never both open at the same time. These valves are in fact both closed when the key is in its up or down position, and are ready for instant use either to open or close the pneumatic lever. The valves being thus normally shut, there is no unnecessary and wasteful delay in closing either of them when it is required to open the other, and, as above explained, they each act as a throttle or cut-off valve, reseating themselves as soon as the purpose for which they were opened is accomplished.

In Fig. 5 I have shown a simple means of limiting the upward range of movement of the forward end of the floating valve-actuating lever E, the said means consisting of a plug, $h$, buffed with or formed of some soft material—such as cork, rubber, felt, or chamois leather—carried by a square-headed screw-spindle, $h'$, the said screw-spindle passing vertically downward through the front rail immediately above the forward end of the floating valve-actuating lever E.

It is obvious that other means may be desired or used for effecting the same purpose.

Referring now to Figs. 6 and 7, I have shown therein two methods of applying my floating lever with a shifting fulcrum to operate the valves of an ordinary and well-known construction of pneumatic lever. In this form of pneumatic lever, which is here represented as adapted for air-pressure, the supply and exhaust valves C and D are (under the old system) both slightly open at the same time, and a certain amount of wind is consequently wasted in effecting each movement of the pneumatic lever, the said wind escaping by one or other of the valves before it effectually closes that valve. The action of the pneumatic lever is consequently retarded, the wind which should be wholly utilized to operate the said pneumatic lever immediately having first to effect the closing of a valve through which a partial leakage of wind is taking place. Now, my improvement enables these valves of an ordinary pneumatic lever to be normally completely closed, (as in the arrangement represented in Figs. 1, 2, and 3,) and that is the position in which they are represented in Figs. 6 and 7 of the drawings. The valves in Figs. 6 and 7, however, being differently situate from those in Figs. 1, 2, and 3, require, in order to be brought under the influence of the floating lever E, to be actuated by a secondary lever or bar, E', or its equivalent, rocking on a fixed fulcrum-pin, $e'$, the alternate rocking of this bar being effected by hinging it to or linking it with the said floating lever E. On depressing the floating lever E the valve C will, owing to the then position of the fulcrum $f$ of the said lever, be forced off its seat, admitting air to the pneumatic lever and instantly or synchronously shifting the position of the fulcrum $f$. The effect of this change of fulcrum is to relieve the valve C and allow it to close under the influence of its spring $c^4$. Similarly, on relaxing the pull put upon the floating lever E through the wire or equivalent connection $e$, the lever E will rise, and, owing to the position of its fulcrum $f$ with reference to the rocking bar E', with which it is connected, will tilt that bar in a direction to pull open the exhaust-valve D, which, as in the former arrangement, is double-seated. So soon as this is done, the air will be expelled from the pneumatic lever, which lever will collapse, and in so doing will shift the position of the fulcrum $f$ of the floating lever E and cause the secondary lever or bar E' to rock and relieve the pull upon the valve D, which valve will instantly reseat itself under the influence of its spring $d'$.

In Fig. 7 the form of the spring H, by which the floating-lever E returns to its normal position, is a spiral tension-spring, instead of a V-shaped compression-spring; but any other form of spring might be employed. It will also be observed that in Fig. 7 the pneumatic lever A is prolonged toward the front, so as to suit the position of the floating lever E, to which it is connected by the link F; but in all the arrangements above described the same feature of novelty is unchanged—viz., a floating lever, E, or its equivalent, connected, respectively, with the pneumatic lever itself, A, and with the wire e or its equivalent, by which the movements of the key under the influence of the player are transmitted to the said floating lever, and so arranged with respect to the supply and exhaust valves C and D that the said valves are actuated and opened by it alternately, and are allowed to reseat themselves so soon as the desired movement of the pneumatic lever has been accomplished.

From an inspection of the drawings it will be seen that when the required extent or range of movement for each end of the floating lever has been settled the proper position for the valve-stems (when directly actuated) or for the point of connection between the floating lever and the valve-actuating lever (when indirectly actuated) can be ascertained by simply drawing diagonals between the four points coinciding in position with the ends of the said floating lever when in its two extreme positions and noting the point of intersection, which will be the point required. It will further be evident that as each end of the lever moves proportionately to the other end the extent to which the pneumatic lever in connection with the one end of the said lever is actuated will depend upon and be governed by the extent of movement imparted, transmitted, or allowed by the player to the other end of the said lever.

It has been usual to apply a throttle valve to pneumatic levers to prevent strain from undue inflation and noise in opening; but by this invention such throttle-valves are no longer necessary, as the supply and exhaust valves are actuated in such a manner as enables them each to serve as a throttle-valve, and thus to secure the almost noiseless working of the pneumatic lever.

It should be observed that it is common, and for some purposes absolutely necessary, in some instruments to group pneumatic levers of gradually-increasing size in series, whereby enormous power can be developed, and it is obvious that the means hereinabove described for actuating the valves of pneumatic levers separately, is equally applicable to actuating the valves of a series of such levers, and this irrespective of the manner or means by which the movement of the keys, pedals, combination knob or piston, or swell-pedal under the control or influence of the player are transmitted to the valve-actuating lever E or its equivalent, whether by manual mechanical, electrical, or pneumatic power or energy.

The invention may be used in combination with an electro-magnet acting upon a valve admitting air-pressure to a floating piston or diaphragm pneumatic lever, or with a small pneumatic lever of any suitable kind, for the purpose of operating the floating-valve-actuating lever E, and may be applied to any of the purposes for which pneumatic levers are now commonly used—such, for instance, as for operating draw-stops and combination movements, and for opening and closing the louver boards or orifices of swell-boxes.

I do not limit myself to the precise arrangement of parts hereinabove described, as they are only given with the object of fully explaining the principle of action, which consists in making the pneumatic lever itself govern the position and consequent operation of the parts by which the movements of the supply and exhaust valves of the said pneumatic lever are effected or controlled. Neither do I limit myself to the precise arrangement of rods and levers hereinbefore described, as they may be varied as circumstances and the means for controlling their movements may require.

Referring to the diagrams Figs. 8 to 13, I have illustrated various mechanical combinations of rods and levers embodying the principle of action of my invention, and it is obvious that many others might be used.

Fig. 8 is a diagram of my valve-actuating lever with a shifting fulcrum in its simplest and best form, as fully illustrated in Fig. 1 of the drawings, and hereinbefore fully described. Fig. 9 shows a similar lever, whose fulcrum is shifted as the pneumatic lever A opens and closes by the movements of a pair of levers, $E^3$ $E^4$, rocking on fixed fulcra, which levers intervene to connect the said fulcrum with the pneumatic lever itself. Fig. 10 shows a similar lever, whose fulcrum is shifted as the pneumatic lever A opens and closes by the intervention of a single lever, $E^3$, rocking on a fixed fulcrum, the position of the air inlet and outlet valves in this case being reversed.

Fig. 11 shows the valves of the pneumatic lever A controlled by the movements of a bell-crank lever, E, on a fixed fulcrum, 4, which is in its turn controlled by a second bell-crank lever, $E^3$, rocking on a fulcrum, 3, and a connecting-rod, 2, which shifts its position as the pneumatic lever opens and closes. The full lines represent the closed position. On pulling down the horizontal arm of the bell-crank $E^3$ its vertical arm will be thrust inward and will, through connecting-rod 2, rock bell-crank E, which will thrust open the air-admission valve and the pneumatic lever will rise. So soon, however, as this happens the fulcrum of lever $E^3$ will be shifted downward and its short arm will be restored to a truly vertical position, thereby relieving the thrust on bell-crank E and allowing the air-inlet valve to close. Fig. 12 shows a somewhat similar arrangement, the valve being controlled by the movement of a bell-crank, E, which itself is controlled by the pneumatic lever A, through toggle-lever 7, and rod 8, and bell-crank $E^3$, hinged or articulated together. The fulcrum-points 4 3 are fixed, the rest are movable.

On pulling down rod $e$, bell-crank $E^3$ will rock, and the toggle-lever 7, being upheld by rod F, will cause bell-crank E to rock so as to open the air-inlet valve. The pneumatic lever will then open, its tail-projection will fall, and with it rod F. The toggle-lever 7 will slightly straighten out, and bell-crank E will rock to its original position, which will allow the air-inlet valve to close.

Fig. 13 shows the valve actuated by the movements of a lever-rod, E, having an inclined or bent position where it passes between the valve-buttons, which inclined part acts like a cam to open the said valves, according to the position of the lever rod or bar, to right or left. On pulling down rod $e$ (the parts being as drawn in full lines) the air-inlet valve will be opened and the pneumatic lever A will rise, thereby rocking bell-crank $E^3$ through rod F, which will thrust the lever-rod to the left and bring the highest portion of the incline over the valve, thus allowing the said valve to rise.

By the term "pneumatic lever," I would have it understood that I mean an expanding or contracting vessel of any form necessary for the utilization and transmission of the energy of compressed or attenuated air, or a vessel in which a piston or diaphragm is caused to move under the influence of air pressure or suction; and,

Having now described my invention, I would remark that what is desired to be claimed is—

1. The combination, with the valves of a pneumatic lever, of a floating lever or equivalent valve-actuating device directly connected with or controlled by the movements of the said pneumatic lever, substantially as described, so that the fulcrum or operative position of the said floating lever or valve-actuating device is shifted or changed synchronously with the movements of the pneumatic lever, and the said floating lever or its equivalent is brought into a position advantageous for instantly and without waste of air effecting the reverse movement of the pneumatic lever, substantially as set forth.

2. The combination, with the valves of a pneumatic lever or with one or more sets of valves in a series of pneumatic levers, of a floating lever or mechanical equivalent having a movable fulcrum, the position of the said fulcrum being determined and controlled by the opening or closing movement of one or other of the said pneumatic levers, as and for the purpose set forth.

3. The combination, with a pneumatic lever, A, and valves C D, of a floating lever, E, and connections $e$ F for the purpose of alternately applying and removing pressure from the said valves, thus allowing them to close or reseat themselves so soon as they have effected the opening or closing of the said pneumatic lever, substantially as set forth.

4. The combination, with the valves of a pneumatic lever, of a floating lever or mechanical equivalent having a movable fulcrum the position of which is controlled by the pneumatic lever itself, the said floating lever being connected and arranged as either directly or indirectly through the intervention of a rocking bar or secondary lever, and link-rods or equivalent means for transmitting motion to actuate the said valves alternately at the will of the player, and so soon as they have effected the desired opening or closing of the said pneumatic lever to automatically relieve the said valves of pressure and allow them to reseat themselves, thereby preventing noise and waste of power, and enabling the pneumatic lever to be vibrated and perform its functions with greater rapidity and instantaneity than was possible heretofore.

5. The combination, with a pneumatic lever, A, wind-chest B, and supply and exhaust valves C D, of a valve or bar, such as E, arranged to act upon the said valves and connected with the pneumatic lever A, substantially as described, whereby, whether the key be up or down, both valves will be closed in readiness for immediate action, either to open or close the pneumatic lever, and the movement of either valve under the influence of the performer is neutralized as soon as made by the resulting opening and closing movement of the pneumatic lever itself.

VINCENT WILLIS.

Witnesses:
H. K. WHITE,
G. H. G. MATHIESON,
  6 *Bream's Building, London.*